US010329094B1

(12) United States Patent
Fitzpatrick et al.

(10) Patent No.: US 10,329,094 B1
(45) Date of Patent: Jun. 25, 2019

(54) CONVEYOR CARRIERS WITH GAP COVER

(71) Applicant: Intelligrated Headquarters, LLC, Mason, OH (US)

(72) Inventors: Jameson Fitzpatrick, Hagerstown, MD (US); Murat Lee Newman, Leesburg, VA (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 0 days.

(21) Appl. No.: 15/977,290

(22) Filed: May 11, 2018

(51) Int. Cl.
*B65G 17/06* (2006.01)
*B65G 17/30* (2006.01)
*B65G 47/38* (2006.01)

(52) U.S. Cl.
CPC ............. *B65G 17/06* (2013.01); *B65G 17/30* (2013.01); *B65G 47/38* (2013.01); *B65G 2207/14* (2013.01)

(58) Field of Classification Search
CPC ................................ B65G 17/06; B65G 17/30
USPC .................................................. 198/321–338
See application file for complete search history.

(56) References Cited

U.S. PATENT DOCUMENTS

| | | | | |
|---|---|---|---|---|
| 6,152,280 A * | 11/2000 | Bruun | ................... | B65G 17/065 198/370.04 |
| 6,360,868 B1 * | 3/2002 | Arlt | ...................... | B65G 17/345 198/370.06 |
| 6,478,138 B1 | 11/2002 | Edwards et al. | | |
| 9,233,803 B2 | 1/2016 | Pilarz et al. | | |
| 9,828,187 B2 * | 11/2017 | Chierego | ............... | B65G 43/08 |
| 9,902,569 B2 * | 2/2018 | Lykkegaard | ......... | B65G 47/962 |
| 2005/0077144 A1 | 4/2005 | Berkers et al. | | |
| 2016/0257501 A1 | 9/2016 | Chierego et al. | | |
| 2018/0221918 A1 * | 8/2018 | Carvelli | ................. | B65G 47/96 |

FOREIGN PATENT DOCUMENTS

WO    WO 2017/025991 A1    2/2017

* cited by examiner

*Primary Examiner* — William R Harp
(74) *Attorney, Agent, or Firm* — Alston & Bird LLP

(57) ABSTRACT

The present disclosure relates to a gap cover including mounting covers, a flexible component, plurality of support plates and support rods. The mounting covers are attached to conveyor carriers of a conveyor system. The flexible component has a plurality of pleated sections positioned in between the mounting covers capable of expansion and contraction. The plurality of support plates are inserted in between each of the pleated sections. The plurality of support rods penetrates with a clearance through each of the pleated sections and one of the mounting covers, wherein the plurality of support plates are positioned transverse to the plurality of support rods to provide a cross member support for articles conveyed on the conveyor carriers.

17 Claims, 7 Drawing Sheets

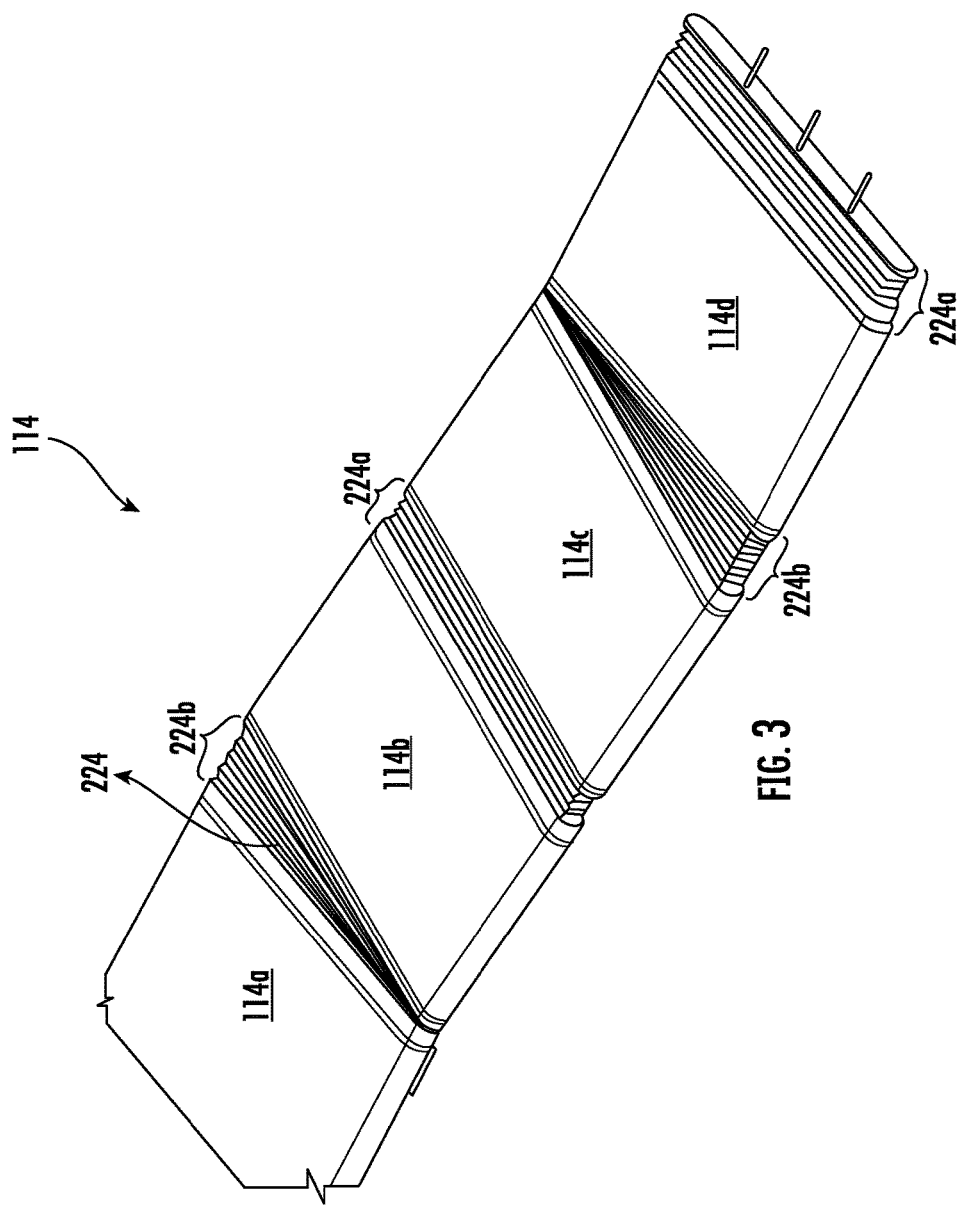

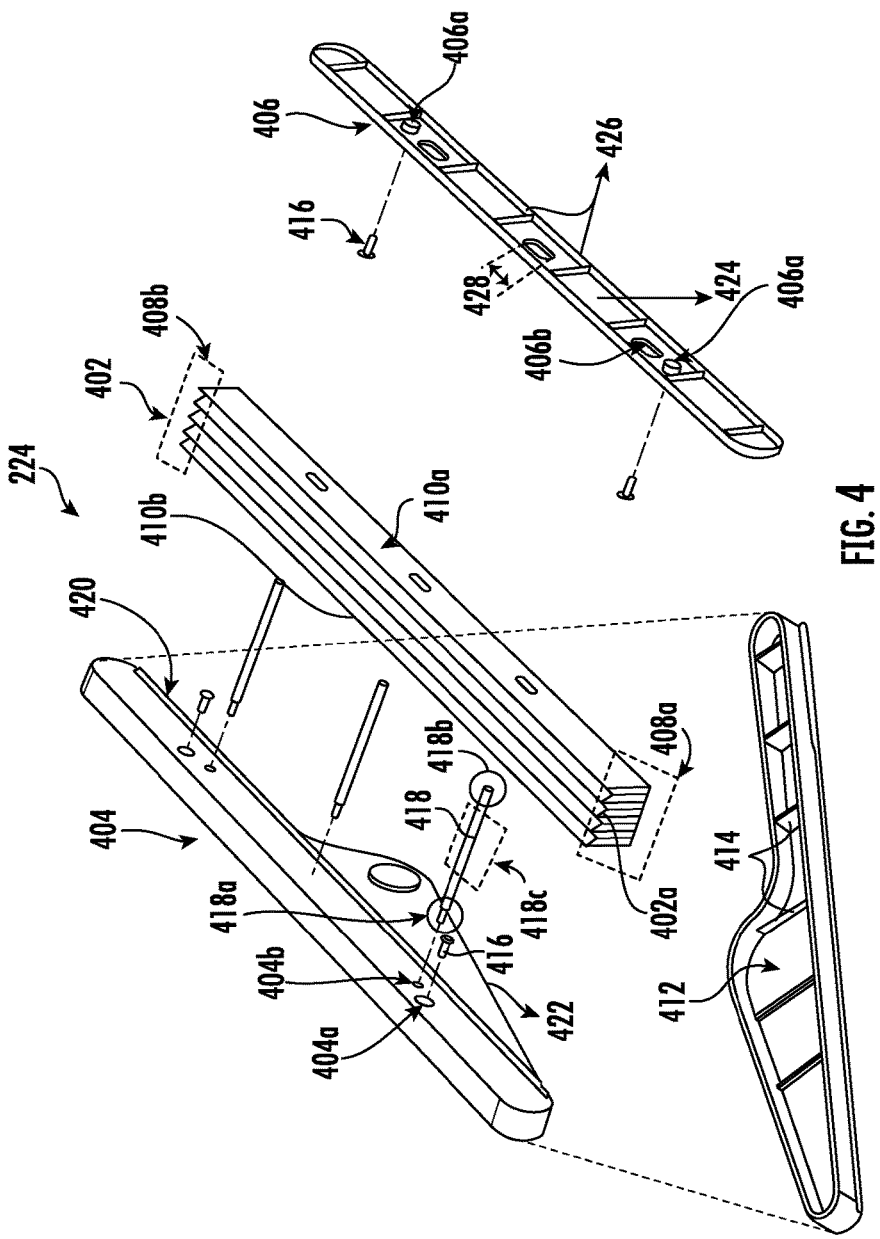

CONVEYOR CARRIERS WITH GAP COVER

TECHNICAL FIELD

The present disclosure relates generally to conveyor systems, and more specifically relates to multiple conveyor carriers employed in the conveyor systems.

BACKGROUND

Conveyor system may include multiple carriers. The multiple carriers may often arranged in an end-to-end configuration. The end-to-end configuration may enable articles on the multiple carriers to traverse either an open loop or a closed loop path. For example, in the end-to-end configuration, the multiple carriers may be arranged with a gap between adjacent carriers. This gap between the adjacent carriers is problematic to articles conveyed on the conveyor belts. For example, in conventional conveyor systems, when small articles, such as flat mails or polybags, with dimension less than the dimension of the gap are conveyed through the multiple carriers, the small articles may be stuck in the gap that exists between the adjacent carriers. When the small articles are stuck in the gap, the conveyor system must be shut down for recovering the small articles from the gap. In this regard, shutting down of the conveyor system at regular intervals for recovering the small articles from the gap affects overall productivity. In addition, the gap allows debris to be lodged between the multiple carriers which may damage few moving components of these carriers over a period of time. Therefore, conventional conveyor systems require regular maintenance for cleaning the debris lodged into the gap. Furthermore, when the conveyor system is handling fragile articles, there exists a possibility of breakage of the fragile articles when stuck in the gap between the adjacent carriers.

BRIEF SUMMARY

The following presents a simplified summary in order to provide a basic understanding of some aspects of the disclosed aspects. This summary is not an extensive overview, and is intended to neither identify key/critical elements nor delineate the scope of such aspects. Its purpose is to present some concepts of the described features in a simplified form as a prelude to the more detailed description that is presented later.

Various aspects described herein relate to a gap cover installed in between adjacent conveyor carriers of a conveyor system. The gap cover includes mounting covers attached to conveyor carriers of the conveyor system. A flexible component with plurality of pleated sections positioned in between the mounting covers and capable of expansion and contraction. A plurality of support plates inserted in between each of the pleated sections and a plurality of support rods penetrating through each of the plurality pleated sections and one of the mounting covers via a set of clearance, wherein the plurality of support plates are positioned transverse to the plurality of support rods to provide cross member support for articles conveyed on the conveyor carriers.

Various aspects described herein relate to the gap cover which is positioned throughout a length of the conveyor system in a gap existing between the conveyor carriers. The gap cover transforms in to one or more configurations depending upon a shape of a gap between the conveyor carriers.

Various aspects described herein relate to the gap cover transforms from a first configuration to a second configuration in order to cover the V-shaped gap between the conveyor carriers, and transforms from the second configuration to the first configuration to cover a rectangular shaped gap between the conveyor carriers.

Various aspects described herein relate to the plurality of pleated sections are stitched together or glued together to form the flexible component.

Various aspects described herein relate to the flexible component which is of a compressible and expandable resilient material.

Various aspects described herein relate to the mounting covers including a first mounting cover comprising a hollow profile with a first set of parallel spaced apart internal ribs placed adjacent to each other in the hollow profile; and a second mounting cover comprising a flat profile with a second set of parallel spaced apart internal ribs placed adjacent to each other in the flat profile.

Various aspects described herein relate to the conveyor system including straight line sections and curved line sections existing in a closed loop path which is traversed by each of the conveyor carriers.

Various aspects described herein relate to the gap cover which transforms its shape from one of a first configuration to a second configuration or the second configuration to the first configuration depending on number of straight line sections and curved line sections existing in the closed loop path.

Various aspects described herein relate to the conveyor carriers including a first surface, a second surface, a top surface, and a bottom surface, wherein the first surface facing a direction parallel to a direction of travel of articles on each of the conveyor carriers, wherein the second surface is opposite to the first surface and facing an opposite direction to the direction of travel of the articles, wherein the top surface is perpendicular to both the first surface and second surface and parallel to the bottom surface, and wherein the top surface supports the articles.

Various aspects described herein relate to the flexible component including two pairs of opposing side faces; wherein a first pair of opposing side faces comprises a first side face and a second side face opposite of the first side face, and wherein one of the first side face and the second side face expands or contracts based on movement of each of the conveyor carriers in the straight line sections and the curved line sections of the conveyor system.

Various aspects described herein relate to a second pair of opposing side faces including a third side face and a fourth side face opposite to the third side face, wherein the third side face attaches to the second mounting cover and the fourth side face attaches to the first mounting cover.

Various aspects described herein relate to the first mounting cover including first set of apertures and second set of apertures, wherein the first set of apertures receive fasteners for mounting the first mounting cover on the first surface of each of the conveyor carriers; and wherein the second set of apertures are threaded holes for holding head portions of the plurality of support rods in threaded engagement on the first mounting cover.

Various aspects described herein relate to the first mounting cover including a protrusion formed integrally on a bottom surface of the first mounting cover.

Various aspects described herein, relates to the second mounting cover including a third set of apertures and fourth set of apertures, wherein the third set of apertures receives fasteners to mount the second mounting cover on the second surface of each of the conveyor carriers, and wherein the fourth set of apertures is provided with and supports a clearance such that the support rods do not mate with the fourth set of apertures.

Various aspects described herein relate to the set of clearance which is provided to facilitate a rocking motion of the support rods when each of the conveyor carriers are transitioning from one of the straight line section to the curved line section or the curved line section to the straight line section.

Various aspects described herein relate to the support plates including a fifth set of apertures, wherein the fifth set of apertures are spaced apart from each other and receives a body portion of the plurality of support rods, wherein each of the fifth set of apertures is provided with and support the set of clearance such that the support rods do not mate with the fifth set of apertures Various aspects described herein relate to the support rods that freely penetrate through the fifth set of apertures provided on each of the support plates and protrude out beyond the fourth set of apertures provided on the second mounting cover, wherein each of the plurality of support rods undergoes a rocking motion by means of the set of clearance provided on both the fourth set of apertures and the fifth set of apertures.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 3 illustrates a perspective view of the portion of the loop sorter of FIG. 2 with the multiple carriers with gap covers in-between, in accordance with an embodiment of present disclosure;

FIG. 4 illustrates an exploded view of the gap cover of FIG. 3, in accordance with an embodiment of present disclosure;

DESCRIPTION

Figure 1:
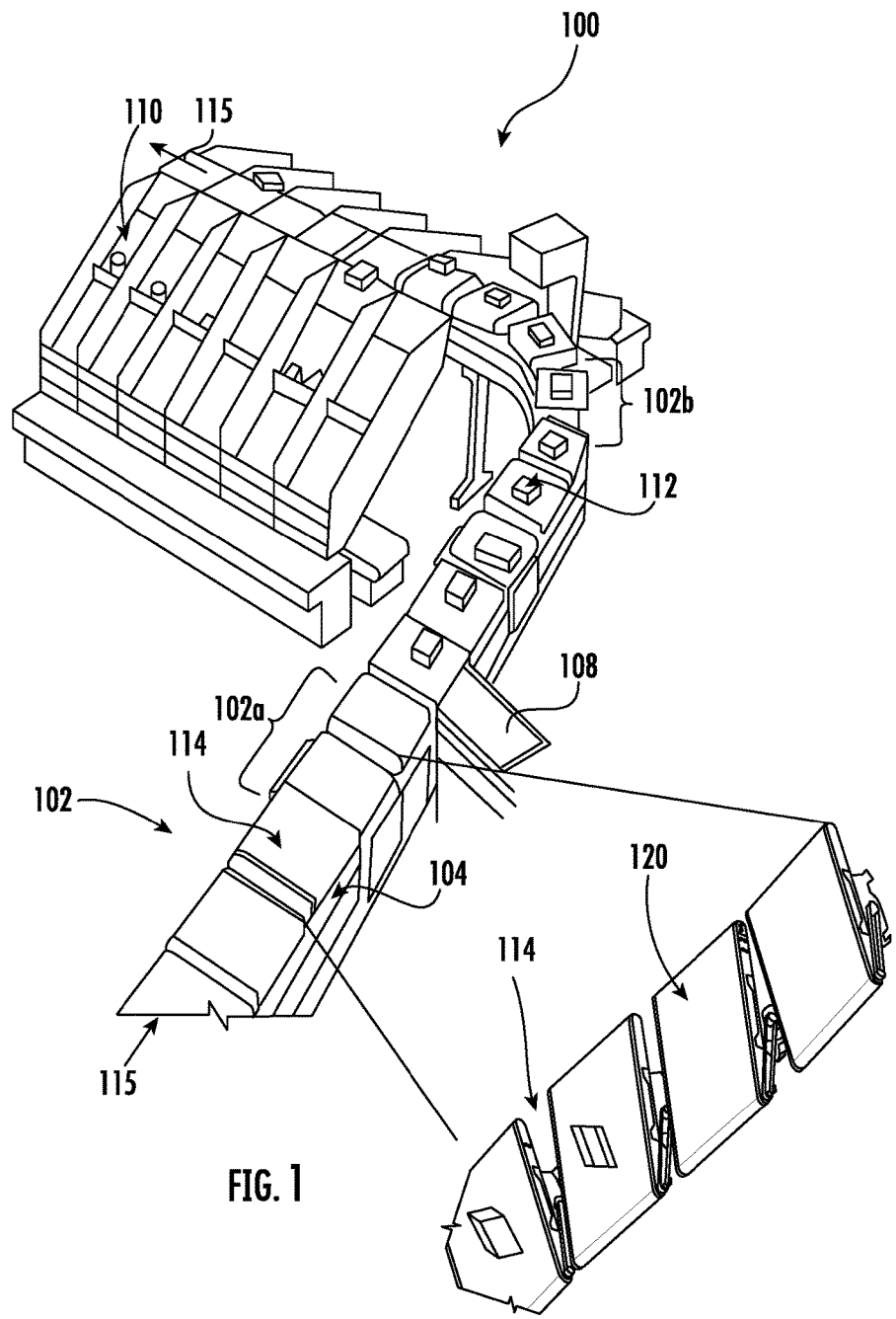
FIG. 1 illustrates a perspective view of a material handling system that includes a loop sorter with multiple carriers installed in a continuous closed loop path, in accordance with an embodiment of present disclosure.

The present disclosure relates to a gap cover capable of filling a gap that exists between adjacent conveyor carriers of a conveyor system. The gap cover includes a flexible component, mounting covers support plates and support rods. The mounting covers attached to conveyor carriers. The flexible component has pleated sections and is attached between the mounting covers with the support rods penetrating with a clearance through each of the pleated sections and one of the mounting covers. The support rods extends throughout the length of the flexible component. In this regard, the gap cover prevents small articles being stuck in the gap that exists between adjacent conveyor carriers in the conveyor system. Further, the gap cover includes the support plates inserted in inserted in between each of the pleated sections of the flexible component. The support plates are positioned transverse to the support rods. The support plates along with the support rods provide a cross member arrangement in order to provide a rigid support to the articles conveyed on the conveyor system, thus preventing the gap cover from sagging over a period of time due to handling of heavy articles. The gap cover is positioned throughout a length of the conveyor system in gaps existing between each of the conveyor carriers, and wherein the gap cover transforms into one or more configurations depending upon a shape of the gaps between each of the conveyor carriers.

The term "straight line sections" is used herein to refer to sections of the conveyor which may be a trackway defined by the multiple carriers guided on a pair of parallel conveyor rails on a straight line path. The term "curved line sections" is used herein to refer to sections which may be a trackway defined by the multiple carriers guided on a curved inner conveyor rail and a curved outer conveyor rail concentric therewith.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice some embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others.

Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a perspective view of a material handling system that includes a loop sorter with multiple carriers installed in a continuous closed loop path, in accordance with an embodiment of present disclosure. The material handling system 100 may include a conveyor 102. The conveyor 102 may include a conveyor bed 104 and one or more conveyor cartridges (not shown). The material handling system 100 includes an induction station 108 positioned adjacent to the conveyor 102 at one end, for example, induction end. The material handling system 100 further includes discharge chutes 110 positioned at the other end, for example, discharge end of the conveyor 102 succeeding the induction station 108.

Examples of the conveyor 102 may include, but are not limited to, a sortation conveyor. According to one or more other embodiments, the conveyor 102 may be any of a cross belt loop sorter, a tilt tray sorter, pusher type sorter and the like. The conveyor 102 is configured to transfer a load 112, for example, one or more objects supported thereon, from a location to another location, for example, from the induction end to the discharge end of the conveyor 102. The conveyor bed 104 is adapted to movably support the one or more conveyor cartridges (not shown) on which one or more carriers 114 are supported. In an example embodiment, the one or more carriers 114 are adapted to support the load 112. Examples of the load 112 may include, but are not limited to, articles, packages, cartons, objects, and the like that may be supported thereon. According to an embodiment, each of the carriers 114 may include cross belts 120 reeved around it (as shown in the break out view of FIG. 1). According to another embodiment, each of the carriers 114 may include tilt trays (not shown). The one or more carriers 114 are endlessly conveyed on the conveyor bed 104 in a looping direction indicated by arrows 115. For example, the one or more carriers 114 trace a closed loop path indicated by arrows 115. Further, the conveyor 102 includes straight line sections 102a and curved line sections 102b existing in the closed loop path, which is traversed by each of the carriers 114. For example, the one or more carriers 114, carrying the load 112 inducted from the induction station 108, may deliver the load 112 at the discharge chutes 110, and upon delivering the load 112, the one or more carriers 114 may return back to the induction station 108 tracing the closed loop path in the looping direction indicated by the arrows 115. In this manner, the one or more carriers 114 are endlessly conveyed on the conveyor bed 104 to receive the load 112, deliver the load 112 to appropriate discharge chutes 110 and return back to receive next load 112 from the induction station 108. The general structure of the one or more carriers 114 has been shown as a breakout view in FIG. 1. The detailed construction of the one or more carriers 114 (as shown in FIG. 1) will be further described in conjunction with FIG. 2.

Figure 2:
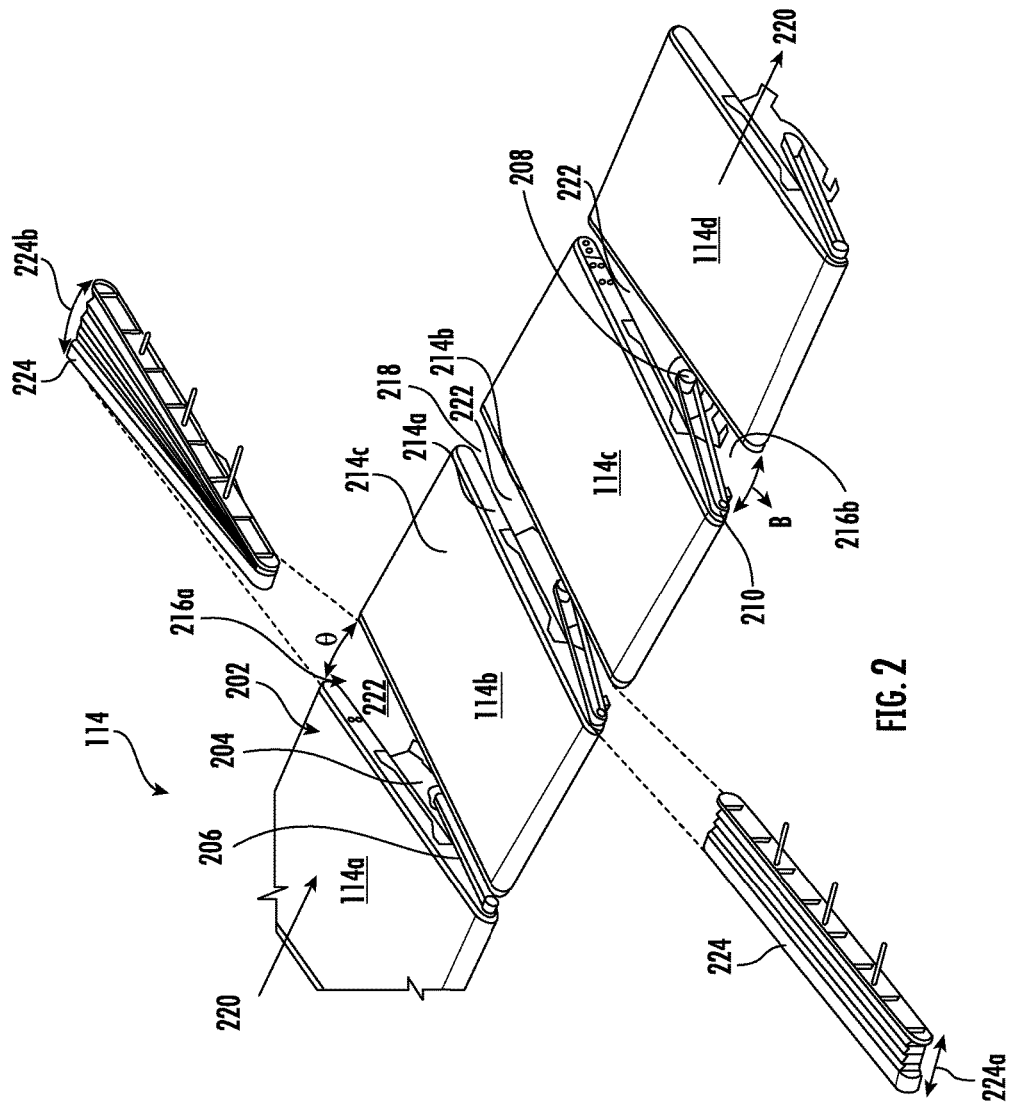
FIG. 2 illustrates a perspective view of a portion of the loop sorter of FIG. 1 with the multiple carriers, in accordance with an embodiment of present disclosure.

FIG. 2 illustrates a perspective view of a portion of the loop sorter of FIG. 1 with the multiple carriers, in accordance with an embodiment of present disclosure. In the embodiment shown in FIG. 2, the one or more carriers 114, for example, includes a first carrier 114a, a second carrier 114b, a third carrier 114c, and a fourth carrier 114d. Each of the carriers 114 are identical or similar in their construction. For example, each of the carriers 114 include cross belt (120, 202), a mounting bracket 204, a belt 206, a driving pulley 208, a driven pulley 210, and a motor (not shown). Each of the carriers 114 include a first surface 214a, a second surface 214b, a top surface 214c, and a bottom surface. The first surface 214a being opposite to the second surface 214b, wherein the first surface 214a facing a direction parallel to the direction of travel of articles indicated by arrow 220 and the second surface 214b facing an opposite direction to the direction of travel of the articles. The top surface 214c being perpendicular to both the first surface 214a and second surface 214b and parallel to the bottom surface, wherein the top surface 214c receives the cross belt 202. In the embodiment shown in FIG. 2, the first surface 214a of the one or more carriers 114 receives a mounting bracket and a driven pulley. For example, FIG. 2 shows a mounting bracket 204 and a driven pulley 210. A mounting bracket may further receives a corresponding driving pulley (such as the driving pulley 208), which in turn may be connected to a shaft of a motor (not shown) provided on the conveyor bed 104. A belt may be connected between a driving pulley (such as the driving pulley 208) and a driven pulley (such as the driven pulley 210) to transmit power from the motor through friction, thus rotating the driven pulley (such as the driven pulley 210). According to an embodiment, the belt 206 may be a timing belt. For example, timing belts are flat belts which are toothed on their inner face. The toothed inner face attaches to both the driving pulley 208 and the driven pulley 210. In such scenarios, the power is transmitted via the toothed inner face instead of friction between the belt and the driven pulley. Since each cross belt (such as the cross belt 202) of each of the carriers 114 is reeved around a driven pulley (such as the driven pulley 210), the rotation of the driven pulley in turn causes the rotation of the cross belt covering each of the carriers 114.

In the embodiment shown in FIG. 2, each of the carriers 114 are dissimilar in their orientation when installed on the conveyor bed 104 or when traversing the path indicated by arrows 115 or 120. For example, the first surface of the first carrier 114a is positioned at an orientation angle θ with respect to the second surface of the second carrier 114b, thus forming a first V-shaped gap 216a between the first carrier 114a and the second carrier 114b. The first surface 214a of the second carrier 114b is positioned substantially parallel to the second surface 214b of the third carrier 114c, with a rectangular shaped gap 218 in-between. Further, the first surface of the third carrier 114c is positioned at an orientation angle β with respect to the second surface of the fourth carrier 114d, thus forming a second V-shaped gap 216b between the third carrier 114c and the fourth carrier 114d. According to an embodiment, the orientation and the orientation angle of each of the carriers 114 may be altered as these carriers 114 travel along the path indicated by arrows 115, 220. For example, when the first carrier 114a and the second carrier 114b travels around the curved line sections 102b of the conveyor 102 (as shown in FIG. 1), the orientation angle between the first carrier 114a and the second carrier 114b may be altered to a greater extent than when travelling in the straight line sections 102a of the conveyor 102 (as shown in FIG. 1). When the orientation angle is altered, a gap 222 existing between the first carrier 114a and the second carrier 114b is also altered and the gap 222 takes the form of either a V-shape, rectangular shape or any other shapes depending on arrangement of the conveyor 102 in the closed loop path. Likewise, the gap 222 existing between the third carrier 114c and the fourth carrier 114d is also altered. In this regard, the gap 222 between each of the carriers 114 transforms from one shape to another, for example, V-shape to rectangular shape or vice versa, depending on number of straight line sections 102a or curved line sections 102b existing in the closed loop path. The V-shaped gap 216a, 216b and the rectangular shaped gap 218 existing between the one or more carriers 114 as shown in FIG. 2 are collectively referred hereinafter as the gap 222 between each of the carriers 114 throughout the description.

When the articles are inducted into each of the carriers 114 from the induction station 108 (as shown in FIG. 1) or from an adjacent carrier, for example, from the first carrier 114a to the second carrier 114b, along the direction of travel indicated by arrow 220, there exists a possibility of the articles being stuck in the gap 222 between each of the carriers 114 when transitioning between adjacent carriers, for example, from the first carrier 114a to the second carrier 114b. For example, when the articles, such as polybags, moves from the first carrier 114a to transition into the second carrier 114b along the direction of travel indicated by arrow 220, the articles may fall into the gap 222, for example, the first V-shaped gap 216a, existing between the first carrier 114a and the second carrier 114b. In another example, when the articles are inducted from the induction station 108 (as shown in FIG. 1) to the third carrier 114c, there exists a possibility that one of the articles may be inducted into the gap 222, for example, the rectangular shaped gap 218, existing between the second carrier 114b and the third carrier 114c, which causes the article to be stuck in-between. In such scenarios, the conveyor 102 may be shut down for recovering the articles from the gap 222. Shutting down of the conveyor 102 at regular intervals for recovering the articles from the gap 222 may in turn affect overall productivity of the material handling system 100. Further, the gap 222 may allow debris to be lodged over a period of time on the moving components, such as the belt 206, the driving pulley 208 and other like components existing in the gap 222. Therefore, the conveyor 102 may require regular maintenance for cleaning the debris lodged into the gap 222.

The present disclosure provides a gap cover 224 to be installed in between the one or more carriers 114 (as shown in FIGS. 1 and 2). The gap cover 224 addresses several deficiency which are encountered due to the gap 222 between the one or more carriers 114 as described above. As shown in FIG. 2, the gap cover 224 may alter its configuration or orientation based on the gap 222, for example, based on the V-shaped gap 216a, 216b or the rectangular shaped gap 218 existing between the one or more carriers 114. According to an embodiment, the gap cover 224 transforms from a first configuration 224a to a second configuration 224b in order to cover the V-shaped gap 216a, 216b and transforms from the second configuration 224b to the first configuration 224a to cover the rectangular shaped gap 218.

FIG. 3 illustrates a perspective view of the portion of the loop sorter of FIG. 2 with the multiple carriers with gap covers in-between, in accordance with an embodiment of present disclosure. As shown in the FIG. 3, the gap cover 224 exists in the second configuration 224b between the first carrier 114a and the second carrier 114b, and the gap cover 224 exists in the first configuration 224a between the second carrier 114b and the third carrier 114c. Likewise, the gap cover 224 exists throughout the length of the conveyor 102 between each of the carriers 114 in either the first configuration 224a or the second configuration 224b. The gap cover 224 exists in the second configuration 224b to cover the V-shaped gap 216a, 216b and exists in the first configuration 224a to cover the rectangular shaped gap 218. A detailed construction of the gap cover will be further described in conjunction with FIG. 4.

Figure 5A:
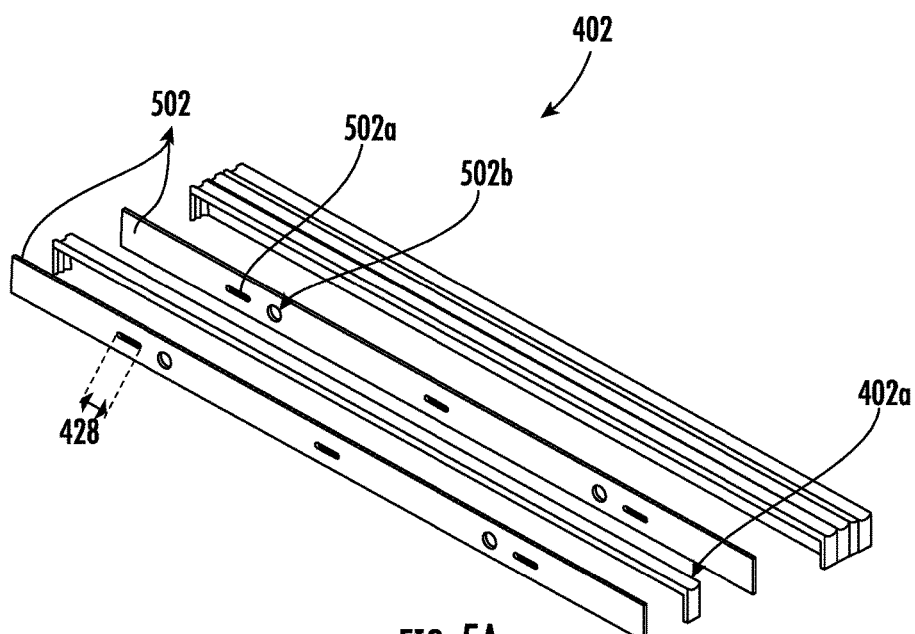
FIG. 5A illustrates an exploded view of a flexible component of the gap cover of FIG. 4, in accordance with an embodiment of present disclosure.
Figure 5B:
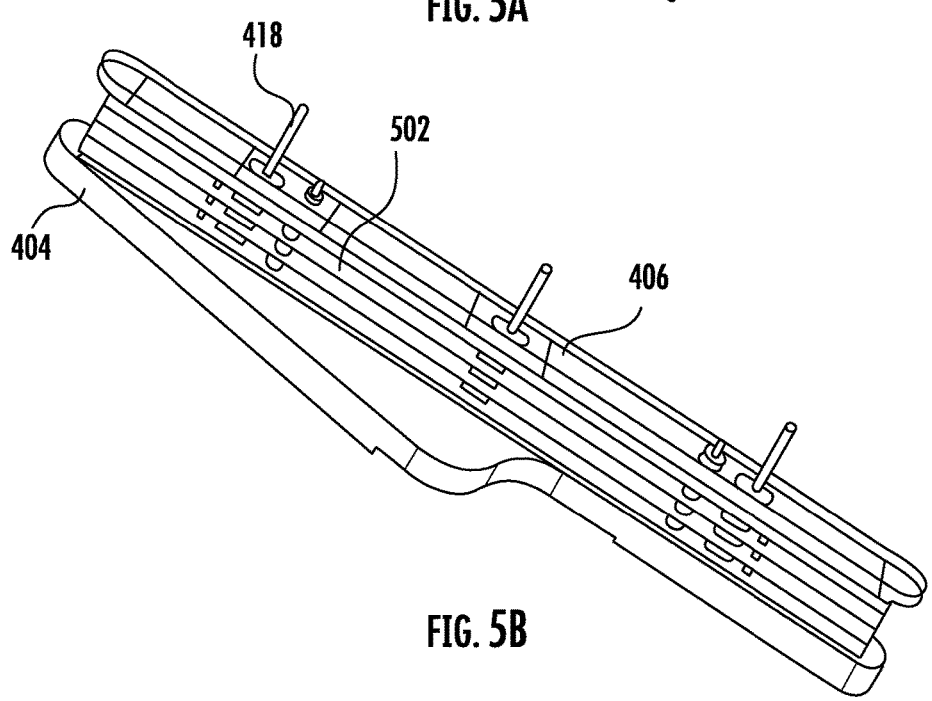
FIG. 5B illustrates a bottom view of the gap cover of FIG. 3 in an assembled form, in accordance with an embodiment of present disclosure.

FIG. 4 illustrates an exploded view of the gap cover of FIG. 3, in accordance with an embodiment of present invention. The gap cover 224 comprises a flexible component 402, a first mounting cover 404, and a second mounting cover 406. The flexible component 402 is of a compressible and expandable resilient material which comprises an elongated body with plurality of pleated sections 402a. The flexible component 402 is open-bottomed (as shown in FIG. 5B) with support plates 502 (as shown in FIG. 5A) inserted in-between each pleated section 402a. According to an embodiment, each of the pleated sections 402a may be stitched together or glued together to form the flexible component 402. The flexible component 402 may be positioned between the first mounting cover 404 and the second mounting cover 406. According to embodiment, the flexible component 402 may include two pairs of opposing side faces: (i) 408(a) and 408(b), and (ii) 410(a) and 410(b). The first pair of opposing side faces, for example, includes a first side face 408a and a second side face 408b opposite of the first side face 408a. The first side face 408a and the second side face 408b either expands or contracts based on movement of each of the carriers 114 in the straight line sections 102a and the curved line sections 102b of the conveyor 102 (as shown in FIG. 1). For example, when the flexible component 402 traverses through the curved line sections 102b, the first side face 408a of the flexible component 402 contracts and the opposing second side face 408b of the flexible component 402 expands and vice-versa. The second pair of opposing side faces, for example, includes third side face 410a and a fourth side face 410b opposite to the third side face 410a. For example, the third side face 410a may be attached to the second mounting cover 406 and the fourth side face 410b may be attached to the first mounting cover 404.

The first mounting cover 404 includes a hollow profile 412 (as shown in the break out view of FIG. 4) with parallel spaced apart internal ribs 414 placed adjacent to each other in the hollow profile 412. For example, the parallel spaced apart internal ribs 414 may be provided for support and stiffness of the first mounting cover 404. The first mounting cover 404 includes first set of apertures 404a and second set of apertures 404b. Each of the first set of apertures 404a may receive fasteners 416 to mount the first mounting cover 404 on the first surface 214a (as shown in FIG. 2) of each of the carriers 114. Each of the second set of apertures 404b may receive support rods 418. Each of the second set of apertures 404b, for example, are threaded holes to hold head portion 418a of the support rods 418 in threaded engagement on the first mounting cover 404. Further, the first mounting cover 404 includes protrusion 422 formed integrally on a bottom surface 420 of the first mounting cover 404. The protrusion 422, for example, has a curved contour. In an example, the curved contour is provided to cover and conform to the shape of the mounting bracket 204 (as shown in FIG. 2) provided on the first surface 214a. In an example, the protrusion 422 may extend throughout the length of the first mounting cover 404 on the bottom surface 420.

The second mounting cover 406 includes a flat profile 424 as shown in FIG. 4 with parallel spaced apart internal ribs 426 placed adjacent to each other in the flat profile 424. For example, the parallel spaced apart internal ribs 426 may be provided for support and stiffness of the second mounting cover 406. According to an embodiment, the second mounting cover 406 may be of a hollow profile 412 similar to the first mounting cover 404. The second mounting cover 406 includes a third set of apertures 406a and fourth set of apertures 406b. Each of the third set of apertures 406a may receive fasteners 416 to mount the second mounting cover 404 on the second surface 214b (as shown in FIG. 2) of each of the carriers 114. On the other hand, each of the fourth set of apertures 406b may receive a tail portion 418b of the support rods 418. For example, the fourth set of apertures 406b may be provided with and support a set of clearance 428 and the support rods 418 may be passed through the set of clearance 428 such that the support rods 418 do not mate with the fourth set of apertures 406b. In an example, the set of clearance 428 is provided to facilitate a rocking motion of the support rods 418 when each of the carriers 114 are transitioning from the straight line section 102a of the conveyor 102 to the curved line section 102b and vice versa (as will described further in conjunction with FIGS. 6A and 6B).

FIG. 5A illustrates an exploded view of a flexible component of the gap cover of FIG. 4, in accordance with an embodiment of present disclosure. The flexible component 402 has plurality of support plates 502 inserted in-between each pleated section 402a. An exploded view of two support plates among the plurality of support plates 502 with one of the pleated section between is shown in the exploded view of FIG. 5A. According to an embodiment, each support plate 502 includes a fifth set of apertures 502a. The fifth set of apertures 502a may be spaced apart from each other on each of the support plates 502 and may receive a body portion 418c (as shown in FIG. 4) of the support rods 418. For example, the fifth set of apertures 502a may be provided with and support a set of clearance 428 and the support rods 418 may be passed through the set of clearance 428 such that the support rods 418 do not mate with the fifth set of apertures 502a. In an example, the set of clearance 428 is provided to facilitate a rocking motion of the support rods 418 when each of the carriers 114 are transitioning from the straight line section 102a of the conveyor 102 to the curved line section 102b and vice versa (as will described further in conjunction with FIGS. 6A and 6B). In an example, the set of clearance 428 provided for the fifth set of apertures 502a may be same as the set of clearance 428 provided for the fourth set of apertures 406b provided on the second mounting cover 406. In an example, dimensions of the fifth set of apertures 502a may be same as the dimensions of the fourth set of apertures 406b provided on the second mounting cover 406. According to an embodiment, each of the support plates 502 may optionally include a sixth set of apertures 502b that facilitates fixing of the plurality of support plates 502 to the first mounting cover 404 or the second mounting cover 406. In an example, the sixth set of apertures 502b may receive fasteners 318, 416 that enables the plurality of support plates 502 to attach to either the first mounting cover 404 or the second mounting cover 406. According to an embodiment, each of the support plate 502 may be attached in between each of the pleated sections 402a using adhesives. Each of the pleated sections 402a along with the plurality of support plates 502 provides a rigid structure for the flexible component 402 preventing sagging of the flexible component 402 when subjected to heavy load.

FIG. 5B illustrates a bottom view of the gap cover of FIG. 3 in an assembled form, in accordance with an embodiment of present disclosure. In FIG. 5B, a bottom view of the flexible component 402 with plurality pleated sections 402a and the plurality support plates 502 inserted in between is shown. The plurality of support plates 502 are positioned parallel to the first mounting cover 404 and the second mounting cover 406, and the support rods 418 are positioned transverse to the first mounting cover 404 and the second mounting cover 406. As shown in FIG. 5B, the support rods 418 penetrate through the fifth set of apertures 502a provided on each of the support plates 502 and protrude out of the fourth set of apertures 406b provided on the second mounting cover 406. For example, the support rods 418 are positioned transverse to each of the support plates 502 to form a cross member support for the articles being conveyed on the flexible component 402. In an example the support rods 418 undergo a rocking motion when travelling through the straight line section 102a and curved line section 102b of the conveyor 102 as will be described further in detail in conjunction with FIG. 6A and FIG. 6B.

Figure 6A:
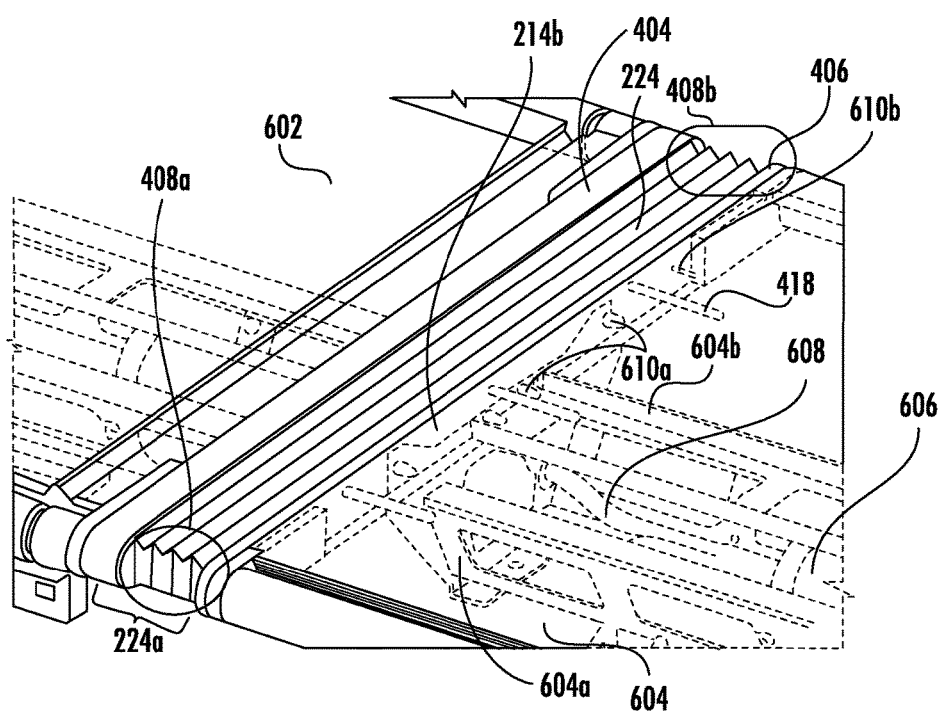
FIGS. 6A and 6B is a detailed view of the gap cover of FIG. 3 when installed between adjacent carriers, in accordance with an embodiment of present disclosure.
Figure 6B:
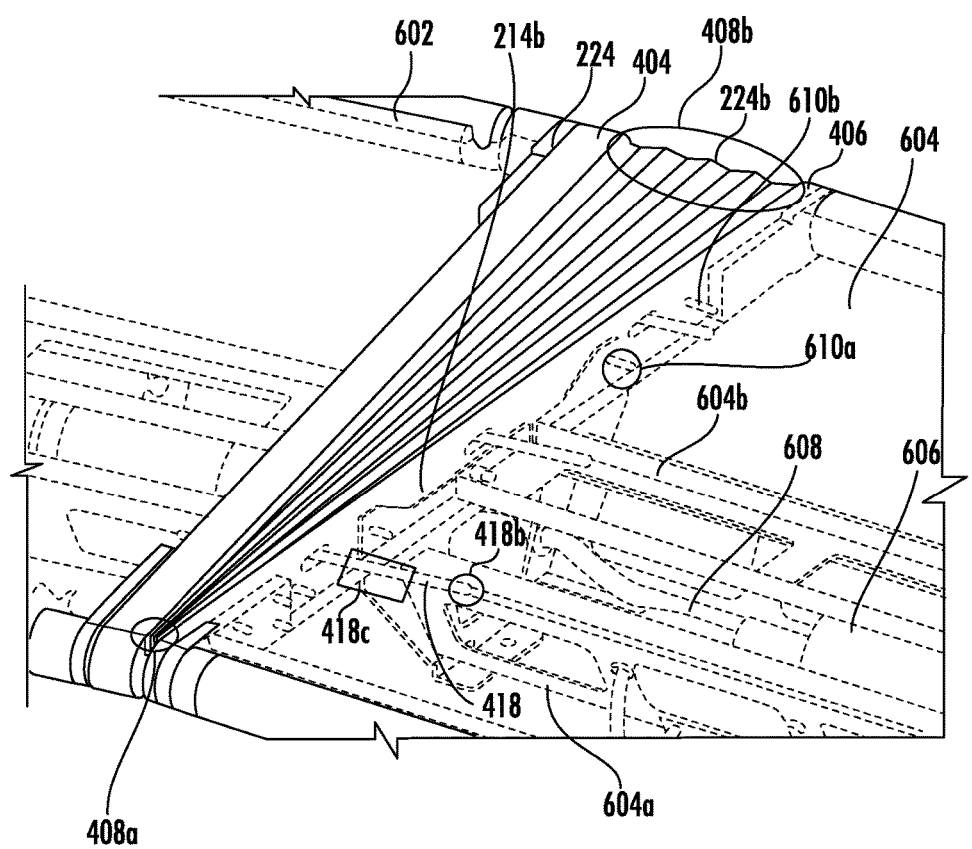

FIGS. 6A and 6B is a detailed view of the gap cover of FIG. 3 when installed between adjacent carriers, in accordance with an embodiment of present disclosure. As shown in the FIGS. 6A and 6B, the gap cover 224 installed between two conveyor carriers, for example, a first conveyor carrier 602 and a second conveyor carrier 604, are shown. According to an embodiment, the first conveyor carrier 602 and the second conveyor carrier 604 may be similar to the first carrier 114a and the second carrier 114b (as shown in FIG. 2). As shown in the FIGS. 6A and 6B, the gap cover 224 transform its shape from a first configuration 224a to a second configuration 224b or vice-versa depending on number of straight line sections 102a or curved line sections 102b existing in the closed loop path indicated by arrow 115 (as shown in FIG. 1).

As shown in FIG. 6A and FIG. 6B, the second conveyor carrier 604 includes a lower frame 604a, an upper frame 604b, a motor 606, wiring harness 608 and a set of mounting screws 610. The set of mounting screws 610 includes first set of mounting screws 610a and a second set of mounting screws 610b. The lower frame 604a and the upper frame 604b of the second conveyor carrier 604 are fastened using the first set of mounting screws 610a. The second set of mounting screws 610b may be provided to fasten the gap cover 224 between the first conveyor carrier 602 and the second conveyor carrier 604. The second conveyor carrier 604 may include a cross belt (as shown in FIG. 2) driven by the motor 606 placed on the lower frame 604a of the second conveyor carrier 604. The wiring harness 608 extends from the motor 606 and may be supported on the lower frame 604a. All of these components are shown in FIGS. 6A and 6B in reference to the second conveyor carrier 604. In some embodiments, the first conveyor carrier 602 also includes the same or like components as that of the second conveyor carrier 604.

As seen in the FIGS. 6A and 6B, the gap cover 224 is mounted in between the first conveyor carrier 602 and the second conveyor carrier 604. The gap cover 224 includes the first mounting cover 404 and the second mounting cover 406. The first mounting cover 404 is mounted on the first surface (for example, 214a reference numeral as shown in FIG. 2) of the first conveyor carrier 602. The second mounting cover 406 is mounted on the second surface (for example, 214b reference numeral as shown in FIG. 2) of the second conveyor carrier 604. The flexible component 402 is mounted in between the first mounting cover 404 and the second mounting cover 406. According to an embodiment, the gap cover 224 including the flexible component 402, the first mounting cover 404, and the second mounting cover 406 exists as a single molded unit, which is installed in between the first conveyor carrier 602 and the second conveyor carrier 604. As seen in FIGS. 6A and 6B, the support rods 418 may penetrate through the flexible component 402 of the gap cover 224 and extend beyond the second mounting cover 406 on the second surface 214b of the second conveyor carrier 604. For example, when the first conveyor carrier 602 and the second conveyor carrier 604 travel along a closed loop path through the straight line sections 102a and the curved line sections 102b (as shown in FIG. 1), one half or one quarter of the body portion 418c of the support rods 418 may always extend beyond the second mounting cover 406. As shown in FIGS. 6A and 6B, when the first conveyor carrier 602 and the second conveyor carrier 604 transit from the curved line section 102b to the straight line section 102a or vice versa, each of the support rods 418 undergo a rocking motion due to the transition. In this regard, there might be a possibility for the support rods 418 to slip out of the set of clearance 428 (as shown in FIG. 5A) provided on the second mounting cover 406 resulting in loss of adequate support for the articles resting or moving on the gap cover 224 and when encountered with heavy articles may cause sagging of the flexible component 402. Thereby, in order to counteract with the rocking motion of the support rods 418 during the transition, each of the support rods 418 are configured to extend beyond the second mounting cover 406.

As shown in FIG. 6B, when the first conveyor carrier 602 transits from the straight line section 102a to the curved line section 102b, the flexible component 402 transforms from a first configuration 224a to a second configuration 224b, wherein the first side face 408a (as shown in FIG. 4) expands and the second side face 408b (as shown in FIG. 4) opposite of the first side face 408a contracts forming a V-shaped configuration. Further, as shown in FIG. 6A, when the first conveyor carrier 602 transits from the curved line section 102b to the straight line section 102a, the flexible component 402 transforms from the second configuration 224b to the first configuration 224a, wherein the first side face 408a (as shown in FIG. 4) is parallel to the second side face 408b (as shown in FIG. 4) forming a rectangular shaped configuration. When the flexible component undergoes a transition from the first configuration 224a to the second configuration 224b or vice versa, the support rods 418 undergo a rocking motion and remains intact within the clearance provided on the second mounting cover 406 without any slippage from out of the second mounting cover 406 since one half or one quarter of the body portion 418c of the support rods 418 always extend beyond the second mounting cover 406. In this regard, the gap cover may be flexible to transform into any configuration and may take up any shape during its transition depending upon the arrangement of the conveyor or path traced by the conveyor carriers and simultaneously provides a rigid support to the articles resting or moving on the gap cover.

Thus, employing such gap covers prevent small articles from being stuck in the gap between adjacent carriers. As a result, the time and effort required for recovery of the small articles from the gap is obviated. Further, the possibility of breakage of fragile articles when stuck in the gap can be completely eliminated. In addition, the gap cover provides a cross member support constituted by the support rods and the support plates, thereby eliminating sagging of the gap cover over a period of time.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

In addition, it should be understood that the figures, which highlight the structure, methodology, functionality and advantages of the present disclosure, are presented as examples only. The present disclosure is sufficiently flexible and configurable, such that it may be implemented in ways other than that shown in the accompanying figures.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A gap cover installed between conveyor carriers of a conveyor system, comprising:
   mounting covers attached to the conveyor carriers of the conveyor system;
   a flexible component with plurality of pleated sections positioned in between the mounting covers and capable of expansion and contraction;
   a plurality of support plates inserted in between each of the plurality of pleated sections;
   a plurality of support rods penetrating through each of the plurality of pleated sections and one of the mounting covers via a set of clearance, wherein the plurality of support plates are positioned transverse to the plurality of support rods to provide cross member support for articles conveyed on the conveyor carriers.

2. The gap cover as claimed in claim 1, wherein the gap cover is positioned throughout a length of the conveyor system in a gap existing between the conveyor carriers, and wherein the gap cover transforms into one or more configurations based on a shape of the gap between the conveyor carriers.

3. The gap cover as claimed in claim 2, wherein the gap cover transforms from a first configuration to a second configuration to cover a V-shaped gap between the conveyor carries, and transforms from the second configuration to the first configuration to cover a rectangular shaped gap between the conveyor carriers.

4. The gap cover as claimed in claim 1, wherein the plurality of pleated sections are stitched together or glued together to form the flexible component.

5. The gap cover as claimed in claim 4, wherein the flexible component is of a compressible and expandable resilient material.

6. The gap cover as claimed in claim 1, wherein the mounting covers comprise:
 a first mounting cover comprising a hollow profile with a first set of parallel spaced apart internal ribs placed adjacent to each other in the hollow profile; and
 a second mounting cover comprising a flat profile with a second set of parallel spaced apart internal ribs placed adjacent to each other in the flat profile.

7. The gap cover as claimed in claim 6, wherein the first mounting cover comprises a first set of apertures and a second set of apertures, wherein the first set of apertures receives fasteners for mounting the first mounting cover on a first surface of each of the conveyor carriers; and wherein the second set of apertures are threaded holes for holding head portions of the plurality of support rods in threaded engagement on the first mounting cover.

8. The gap cover as claimed in claim 6, wherein the first mounting cover comprises a protrusion formed integrally on a bottom surface of the first mounting cover.

9. The gap cover as claimed in claim 7, wherein the second mounting cover comprises a third set of apertures and a fourth set of apertures, wherein the third set of apertures receives fasteners to mount the second mounting cover on a second surface of each of the conveyor carriers, and wherein the fourth set of apertures supports the set of clearance for the plurality of support rods.

10. The gap cover as claimed in claim 9, wherein each support plate comprises a fifth set of apertures, wherein each of the fifth set of apertures is spaced apart from each other and receives a body portion of the plurality of support rods, wherein the fifth set of apertures supports the set of clearance for the plurality of support rods.

11. The gap cover a claimed in claim 10, wherein each of the plurality of support rods freely penetrates through the fifth set of apertures on each of the plurality of support plates and protrudes out beyond a fourth set of apertures on a second mounting cover, wherein each of the plurality of support rods undergoes a rocking motion by means of the set of clearance on both the fourth set of apertures and the fifth set of apertures.

12. The gap cover as claimed in claim 1, wherein the conveyor system comprises straight line sections and curved line sections existing in a closed loop path traversed by each of the conveyor carriers.

13. The gap cover as claimed in claim 12, wherein the gap cover transforms from one of a first configuration to a second configuration or the second configuration to the first configuration based on a number of the straight line sections and the curved line sections existing in the closed loop path.

14. The gap cover as claimed in claim 1, wherein each of the conveyor carriers comprises a first surface, a second surface, a top surface, and a bottom surface, wherein the first surface facing a direction parallel to a direction of travel of articles on each of the conveyor carriers, wherein the second surface is opposite to the first surface and facing an opposite direction to the direction of travel of the articles, wherein the top surface is perpendicular to both the first surface and the second surface and parallel to the bottom surface, and wherein the top surface supports the articles.

15. The gap cover as claimed in claim 1, wherein the flexible component comprises two pairs of opposing side faces, wherein a first pair of opposing side faces comprises a first side face and a second side face opposite of the first side face, and wherein one of the first side face and the second side face expands or contracts based on movement of each of the conveyor carriers in straight line sections and curved line sections of the conveyor system.

16. The gap cover as claimed in claim 15, wherein a second pair of opposing side faces comprises a third side face and a fourth side face opposite to the third side face, wherein the third side face attaches to a second mounting cover and the fourth side face attaches to a first mounting cover.

17. The gap cover as claimed in claim 1, wherein the set of clearance facilitates a rocking motion of the plurality of support rods when each of the conveyor carriers are transitioning from one of straight line sections to curved line sections or the curved line sections to the straight line sections.

* * * * *